United States Patent
Mewes et al.

(10) Patent No.: US 6,435,207 B1
(45) Date of Patent: Aug. 20, 2002

(54) FLOW REGULATION FITTING

(75) Inventors: Frank Mewes, Bayreuth; Torsten Gabelmann, Dirmstein; Alois Illy, Limburgerhof; Heinz-Juergen Ruckert, Grossniedesheim, all of (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 09/331,228

(22) PCT Filed: Nov. 13, 1997

(86) PCT No.: PCT/EP97/06341

§ 371 (c)(1),
(2), (4) Date: Jun. 18, 1999

(87) PCT Pub. No.: WO98/28670

PCT Pub. Date: Jul. 2, 1998

(30) Foreign Application Priority Data

Dec. 21, 1996 (DE) .......................... 196 53 937
Jun. 16, 1997 (DE) .......................... 197 25 376

(51) Int. Cl.⁷ .......................... F16K 31/02; G05D 7/06; F24D 19/10
(52) U.S. Cl. .................. 137/487.5; 137/486; 137/551; 73/204.11; 73/861
(58) Field of Search ............... 137/486, 487.5, 137/551; 73/203, 204.11, 861

(56) References Cited

U.S. PATENT DOCUMENTS

| | | | |
|---|---|---|---|
| 3,279,496 A | * 10/1966 | Klass et al. | 137/487.5 |
| 4,264,961 A | * 4/1981 | Nishimura et al. | 364/510 |
| 4,445,369 A | * 5/1984 | Stoltman et al. | 73/204 |
| 4,679,585 A | * 7/1987 | Ewing | 137/486 |
| 4,685,331 A | * 8/1987 | Renken et al. | 137/486 |
| 4,695,034 A | * 9/1987 | Shimizu et al. | 137/486 |
| 5,129,418 A | * 7/1992 | Shimomura et al. | 137/487.5 |
| 5,251,148 A | * 10/1993 | Haines et al. | 137/487.5 |
| 5,358,177 A | * 10/1994 | Cashmore | 137/486 |

FOREIGN PATENT DOCUMENTS

| | | |
|---|---|---|
| DE | 3432494 | 3/1986 |
| DE | 3432494 A1 * | 3/1986 |
| DE | 4030104 | 3/1992 |
| EP | 565485 | 10/1993 |
| EP | 652420 | 5/1995 |
| EP | 671578 | 9/1995 |
| WO | WO 92/03677 | 3/1992 |

OTHER PUBLICATIONS

"Intellignte" ERHARD–Armaturen (The "Intelligent" ERHARD valve) (1994).

* cited by examiner

Primary Examiner—Michael Powell Buiz
Assistant Examiner—Ramesh Krishnamurthy
(74) Attorney, Agent, or Firm—Crowell & Moring LLP

(57) ABSTRACT

A flow regulation control valve for regulating volume flows in pipelines including valve housing with a flow chamber, a control or shut-off member arranged in the flow chamber for setting a desired flow state through the valve, at least one sensor arranged in the vicinity of the flow chamber of the valve housing for sensing a characteristic value of the flow through the flow chamber, an electronic data store or memory for storing specific characteristic values of the housing of the flow regulation control valve, and an evaluation unit which is connected to the sensor and determines the volume flow from the values measured by the sensor with reference to the characteristic values of the valve stored in the data store.

20 Claims, 3 Drawing Sheets

FLOW REGULATION FITTING

BACKGROUND OF THE INVENTION

The invention relates to a flow regulation control valve for setting and measuring volume flows in pipes, in particular in pipes of supply systems. The invention makes it possible for an actual state of a volume flow to be recorded with the aid of measuring instruments with evaluation and display devices and for a desired state to be set by means of a control member of the valve.

Piping systems distribute a conveyed medium to individual usage points within a building or in a plant. Such piping systems usually have a large number of branches, and there is the problem of guaranteeing a supply which meets the respective demand under full load at the individual usage points. The ability to make an adjustment is needed for the most unfavourable operating state of a piping system, in which all the users demand the maximum supply at the same time. In this case, the supply to the users, for example heat exchangers, should neither be insufficient nor excessive. For this purpose, it is known to adjust the individual pipe sections accordingly.

Flow regulation control valves which are fitted with connections for pressure-measuring lines are useful for this purpose. A separate pressure-measuring device which can be connected thereto measures the differential pressure inside the valve between two measuring points which are spaced apart from one another. There is usually also a shut-off member for the flow control valve located between the two measuring points. After the differential pressure has been measured, the instantaneous volume flow is determined with the aid of existing specific characteristic values of the valve and knowledge of the position of the shut-off member relative to the associated seat. By changing the position of the shut-off member, the volume flow is changed in order to establish a desired volume flow by means of further measuring and control operations. Such valves for section control are known from the publications DE-C 40 30 104, EP-A 0 671 578 and WO 92/03677.

This kind of section control is very time-consuming and cumbersome, and it is even more awkward to carry out in the case of large and branched pipe sections. In this context, it is also known use measuring computers to convert the differential pressures measured in section control valves into the respective throughflow volumes. For this purpose, the specific data of a valve must be stored in the measuring computer. To do so, it is also absolutely essential to know the momentary position of the shut-off member in relation to the associated seat. Changing the position of the shut-off member causes a change in the throughflow volume. Depending on the construction of the valve, the respective stroke or rotational position of a shut-off member of a flow regulation control valve must be recorded by the operator and, in addition, entered manually into the measuring computer.

Although such flow regulation control valves permit an exact setting of the throughflow volumes in different pipe sections, they also have many disadvantages. There is the risk of the measuring bores in the housing becoming soiled. Considerable measuring errors may occur if the necessary pressure-measuring lines have not been vented with extreme care. Furthermore, the assembly and the disassembly of the measuring lines at the pressure measuring points of a pressurized housing in which high temperatures and/or pressures can prevail constitute a great potential hazard. To avoid inaccuracies in the measurements which result due to the occurrence of eddies inside the housing which have adverse effects on the measuring parameter, sufficiently long settling routes are usually required in front of and behind the measuring points in order to assure sufficient measuring accuracy. The handling of the overall measuring device is also very awkward.

Another type of adjustment of pipe sections is known from the product TACO-SETTER, which is published in the catalogue of the company Gebrüder Tobler AG, Haustechniksysteme, CH-8902 Urdorf, 1994 edition, pages 2.59 and 2.60. This is a throughflow measuring device which can be inserted directly into a piping system and has an integrated fine control valve. The throughflow volume displayed by the throughflow measuring device can be changed with the aid of the fine control valve. However, this solution has the disadvantage that its use is limited to clean liquids. Due to the mechanical construction of this throughflow measuring device, periodic servicing and additional monitoring outlay are required. In the case of soiled media, incorrect measurements are therefore to be expected. Additionally, such a throughflow measuring device which is installed directly in the flow path also changes the flow resistance in the piping system. Attempts have been made to avoid the latter disadvantage by arranging the throughflow meter in a bypass line around a shut-off valve. Although this solution improves the operability, it brings about a reduction in the measuring accuracy.

A sensor in the form of a pressure monitor with integrated temperature measurement is known from FR-A-2 713 764. This sensor, which is to be installed in a pipe, has a diaphragm which reacts to changes in pressure. If stipulated threshold values are exceeded, a switch-on or switch-off signal is emitted. With the aid of the temperature recording device, the presence of a flow is also determined at the same time and is displayed with the aid of additional devices.

DE-A 34 32 494 discloses a regulating and/or control arrangement for regulating or controlling the throughput of gas or liquid flows in pipelines. This device is intended to permit flexible configuration of industrial or technical plants to facilitate changes or expansion. The solution proposed for this provides for the actuating element, the actuator, the sensor and the control device to be combined into one structural unit and for it to be possible for this unit to be inserted as such into the pipeline. This collection to form a single structural unit is intended to permit easier installation at the suitable point in a pipeline. By comparison with the previous regulation systems, which were constructed from discrete components and require more space, the simpler connection technique of the individual components, which are accommodated in a single housing and are fed by a common power supply, is an advantage. According to FIG. 1, however, this actuating unit has a considerable overall size. It must be constructed to be at least sufficiently large to be able to accommodate a three-way valve, parts of the pipelines connected to the three-way valve and a relatively long pipeline section in which a sensor is arranged at a distance from the three-way valve. The sensor has to be arranged at a large distance from the three-way valve in order for the pipeline section, which acts as a quieting section, to be able to balance out the flow turbulence which occurs within the valve. The document is always concerned only with a sensor which is used in a pipeline and which, depending on its construction, can record different physical, chemical or biological states of a medium.

The actuating unit, which is configured on the building-block system, can always be fitted with only one sensor, it having to be ensured that the control variables output by the various sensors which can be used are compatible with the input signal values of a control device. In addition to the control variable input to the control device from the replaceable sensor, there is a further permanently arranged sensor as a temperature sensor. Since in many applications the temperature constitutes an interfering variable and can impair a regulation process, the interfering variables output by the permanently installed temperature sensor, and the controlled variable supplied by the replaceable sensor, which is in contact with the conveyed medium, are conditioned in the control device and processed to form an activating signal in which the interfering variable has been compensated for.

This solution, in the form of an autonomous, decentralized intelligence, has a very large overall volume and can therefore be used only in large process plants. The construction as a structural unit certainly permits simpler installation but constitutes a structure which is difficult to handle because of the multi-way valve and the pipeline which functions as a collecting line, together with the sensor which is installed therein at a distance from the multi-way valve, arranged within a common housing. The spacing due to the pipeline between the valve and the sensor is functionally necessary to be able to obtain reliable measurements. This is because in order to be able to obtain a reproducible measured signal, in this solution the sensor must be arranged to be separated from the valve by the pipeline section which serves as a quieting section. Turbulence arising in the valve housing is compensated therein on the way to the sensor.

Additional overall volume is necessitated by an actuating motor for the valve, likewise arranged within the housing, a gear mechanism, an end-position sensor for detecting the end positions of the closure member of the actuating element, as well as an additional temperature sensor for eliminating temperature changes as interfering variables.

The so-called inductive throughflow measuring devices are, for example, very precise and contactless without causing any additional flow resistance. Since they are very expensive, they are usually only used for short times for adjustment at a measuring location. This necessitates great expenditure in the form of shutting down the plant, emptying the plant and installing and dismantling the measuring device, and subsequently starting up the plant. If the construction of a plant is changed, repeat measurements are required, entailing equally great expenditure.

It is the object of the invention to provide a simple possibility of adjusting pipe sections, with the aid of which a volume flow can be adapted in a less complex manner to the respective conditions of the pipe.

The solution to this problem envisages that a sensor which directly or indirectly records the volume flow of the flow chamber is arranged in the region of the flow chamber, that specific characteristic values of the section control valve are stored in an electronic data store, and that an evaluation unit determines the volume flow from the values measured by the sensor and from the characteristic values of the data store. It can usually be assumed that the sensor is located at an installation site with constant or reproducible flow conditions in the inflow region of the valve housing. Existing shut-off valves, preferably lift valves with good throttling properties, can thus be used in a simple manner as flow regulation control valves at the same time. Flow regulation control valves with special measuring bores which are of complicated design and manufacture and the risks involved with the connection of measuring lines can be dispensed with. It is sufficient for the manufacturer to integrate a sensor into a housing of a shut-off valve, the surface of the sensor being at least flush with the flow chamber or protruding slightly into the latter. The volume flow can thus be measured without having a disturbing effect on the flow. For this purpose, a measuring parameter is used which is provided by the sensor and is proportional to the volume flow. The dependency of this measuring parameter on the volume flow prevailing in the valve is preferably determined by means of a calibration operation. Other methods, for example calculatory methods, may also be used for determining the relationship of the measuring parameter to the volume flow. The sensor remains permanently in the housing and is arranged in a sealing manner therein. Thus, if such a flow regulation control valve is used, it is no longer necessary to intervene in the pressure-conducting piping system when there is a demand. Depending on the construction, the volume flow could be read from the evaluation unit directly or after setting up a data connection. This can be done without difficulty and poses no risk to the operator or the environment.

According to a further solution to the problem, the flow chamber of the flow regulation control valve is operatively connected to the flow chamber of a separate flow housing, a sensor which directly or indirectly records the volume flow of the flow chamber is arranged in the region of the flow chamber of the separate flow housing, and specific characteristic values of the flow regulation control valve constructed as a structural unit are stored in an electronic data store, and an evaluation unit determines the volume flow from the values measured by the sensor 6 and from the characteristic values stored in the data store.

This enables a standard shut-off valve to be converted to a flow regulation control valve in a simple manner. The arrangement of the flow housing containing the sensor in the immediate vicinity of the shut-off valve makes it possible to manufacture a flow regulation control valve as a modular unit which is easy to assemble. A flow regulation control valve which is manufactured as a modular unit in this way merely requires a single calibration in order to be able to measure the flow-related operational condition. The flow-related operational condition is influenced by a change in the position of the control and/or shut-off member. The calibration of the modular unit satisfies the precondition in order to be able to carry out expedient measurements with the aid of the sensor. Compared to volume-flow measuring instruments which have to be installed in a pipe separately, the flow regulation control valve configured and calibrated as a modular unit results in a considerable shortening of the construction length. This is because this overall arrangement can dispense with a settling route between the separate flow housing and the flow regulation control valve, which settling routes are absolutely essential for settling the flow to be measured between commercially available volume-flow measuring instruments and flow regulation control valves.

For example in existing piping systems, so-called old plants, this permits shut-off valves with a long valve construction length to be replaced by a section control valve which comprises a modular unit constructed of a compact valve of short length and a separate flow housing with an integrated sensor. Using adapters which may be necessary to compensate for the difference in the construction lengths, installation is possible without changing the existing pipe.

The sensor employed converts the physical parameter to be measured and changes therein into an electrical parameter and changes therein, which can be further processed or transmitted electronically. Depending on the construction of the sensor and the degree of integration and/or miniaturization employed, both signal preparation and signal processing can be incorporated in the sensor.

A refinement of the invention envisages a sensor which operates according to the calorimetric measuring principle. Depending on the valve housing employed, an installation site is selected for the sensor, at which reproducible flow conditions prevail within the relevant throttling range, which flow conditions are independent of the position of the shut-off body relative to its seat. This is the case in a simple manner on the inflow side of a flow-conducting housing, especially in the region of the entry flange, particularly displaced by 90° relative to the spindle axis. It is thus no longer necessary in order to determine the volume flow to record the position of the shut-off body in relation to its seat. The relation between the measured signal and the volume flow is determined, for example, experimentally by means of a calibration operation.

If valves are employed which due to their shape give rise to difficult flow conditions, a plurality of sensors can be used. These are then arranged distributed around the circumference in the region of the flow cross-section to be measured. For such applications, the volume flow is determined by forming an average value from the values measured by the individual sensors.

A further refinement of the invention envisages that the sensor in the wall of the flow chamber is at least flush with the surface or protrudes with a slight projection into the flow chamber. This measure guarantees, on the one hand, reliable recording of the volume flow which is reproducibly related to the measuring signal. On the other hand, any increase in the resistance coefficient of the valve thus caused is negligible.

According to a further refinement of the invention, the evaluation unit may be connected to the sensor either directly or via connecting means. The evaluation unit can thus be mounted as a compact, highly integrated unit directly on the sensor or with the interposition of connecting means on the valve. The volume flows prevailing at a given moment in the valve can be read off directly with the aid of display devices. Depending on the construction of the evaluation unit, this could take place continuously or only when there is a demand.

According to a further refinement, the characteristic values specific to the valve housing are contained in the electronic data store in the form of a table, in the form of a characteristic curve or as an algorithm. If the sensor is, for example, integrated into a flange of a valve housing and is fitted with its own electronic data store, flow regulation control can take place in a very simple manner. The characteristic values typical of a specific housing are stored permanently in the installed sensor. Every sensor can be calibrated by the manufacturer in accordance with its specific installation site. In order to adjust a plant precisely, an evaluation unit must be connected to the sensor. Based on the measured parameters provided by the sensor and in conjunction with the associated characteristic values, the desired volume flow can be adjusted quickly and without difficulty in a very simple manner with the aid of the evaluation unit. For this purpose, the position of the shut-off member merely has to be changed manually or automatically depending on the design. It is not necessary to input an additional calculation variable, e.g. the position of the shut-off body. When setting up a calibration curve, the associated measurements for several and different preset volume flows within the relevant volume flow range of the respective housing are recorded and associated. Inaccuracies are thus compensated; the result is more precise and savings can be made compared to the previous partially manual and calculatory outlay. The data can be stored in the electronic data store as a characteristic curve, table, algorithm or in another known form. It is also possible to determine and display the mass flow from the volume flow with the aid of known means.

Further refinements of the invention are described hereinafter. Accordingly, the electronic data store can contain the characteristic values for a specific housing in the form of a table, in the form of a characteristic curve or as an algorithm. Depending on the type and construction of the electronic data store used, the characteristic values typical of the specific valve can be stored in a form which permits unproblematic read-out by means of an evaluation unit and the computing elements located therein. The data store may also be integrated into the sensor or into the evaluation unit. The data store may likewise be arranged partially in the sensor and partially in the evaluation unit, with the data store integrated into the sensor containing at least one valve recognition signal. Furthermore, in addition to a microcontroller, the evaluation unit contains a voltage supply which can be configured as a connection to an external apparatus or is present as an internal apparatus in the form of batteries, accumulators or the like. Additionally display devices, operating elements and the necessary connection elements may be included.

The adjustment of the flow through a section takes place by means of simply adjusting the shut-off member of the flow regulation control valve until the desired volume flow is displayed in the evaluation unit. Depending on the requirement, the evaluation unit may be configured as a permanently installed component or as a mobile device. The connection between the evaluation unit and the respective sensor can be made using conventional connectors. These may be permanent or releasable connections or wireless communication means, such as infrared transmission, radio waves and the like.

Other refinements of the invention envisage that a data store with a small storage capacity integrated into the sensor contains a valve recognition signal, and that an electronic data store located in the evaluation unit contains characteristic values of the valve in characteristic curves or in the form of a table.

In this case, the evaluation unit will contain a considerably larger electronic data store with all the characteristic values of the valves which can be adjusted therewith. The small data store of a sensor then contains only a code identifying the particular flow regulation control valve in which it is installed. When the sensor communicates with the evaluation unit, the corresponding valve data is read out from the larger store of the evaluation unit based on the respective identification code and is made available for processing. Customary storage media may be used as electronic data stores.

With the aid of one or more interfaces which can be connected to a bus system, the values measured by the sensor and the respective characteristic curves of the assigned housing can also be transmitted to a central control or switching point. By means of the data exchange via the interfaces, the data or the measured values can be exchanged with a central control or switching point or with other elements of the piping system.

It is also possible to integrate a display into the evaluation electronics which directly displays the current volume flow based on the measured variables recorded by the sensor. In order to minimize the constructional expense, the sensor is configured as a passive element whose voltage supply is provided via the evaluation unit. In this case, known energy sources can be employed.

Furthermore, an element may be integrated into the sensor, with which the temperature of the medium located inside the housing can be recorded. This value can also be displayed directly on the display of the evaluation unit.

A further advantage can thus be achieved in a very simple manner by the fact that the heat output transported inside the pipes and/or the heat consumption are calculated and displayed. The heat output present in piping systems can be calculated from the measurement or calculation of the temperature difference, for example between the forward flow and return flow, and the volume flow. Only an additional time measurement is required to calculate the heat consumption. The measured and calculated values required and additional structural and operational elements can be integrated into the evaluation unit or into a central control point. The sensors can also be connected to such a control point by means of appropriate connection lines.

A major advantage of this invention is that the respective volume flow and the momentary medium temperature can be read directly at the flow regulation control valve without any further manual effort. The additional throughflow measuring instruments for the pipe previously required for this purpose are dispensed with as is the awkward pressure-loss measurement, which required additional hose connections to a flow regulation control valve. The expenditure for the respective adjustment is thus reduced considerably and a saving in space is also possible at the same time. Integrating the sensor into an ordinary shut-off valve or into a separate flow housing which interacts therewith does not change its shut-off function, and the use of a special flow regulation control valve with the problematic connection lines for the recording of measurement data can be dispensed with.

The evaluation unit also permits a desired value of the required volume flow to be input directly into the evaluation unit during an adjustment operation. With the aid of the transmission means between the evaluation unit and the sensor, this desired value can be stored in the data store of the sensor. Depending on the construction of the plant, it is possible to establish in a very simple manner, with temporary or permanent monitoring by means of a target value/ actual value comparison, whether there is any discrepancy. If this were to be the case, a readjustment could be carried out by actuating the valve. The control mechanism may be a customary handwheel, a hand lever or an adjusting motor. A readjustment can be carried out in a very simple manner due to the possibility of direct visual recording of the momentary volume flow on a display and without the additional outlay in terms of measuring equipment to record the location or position of the shut-off members. If the evaluation unit, which can be used in a stationary or mobile manner, were to be arranged permanently on a housing to be monitored, the manner of attachment is selected so as to allow a display irrespective of the position in which the housing to be monitored is installed.

Illustrative embodiments of the invention are shown in the accompanying drawings, and are described in greater detail below.

DETAILED DESCRIPTION OF PREFERRED EMBODIMENTS

Figure 1:
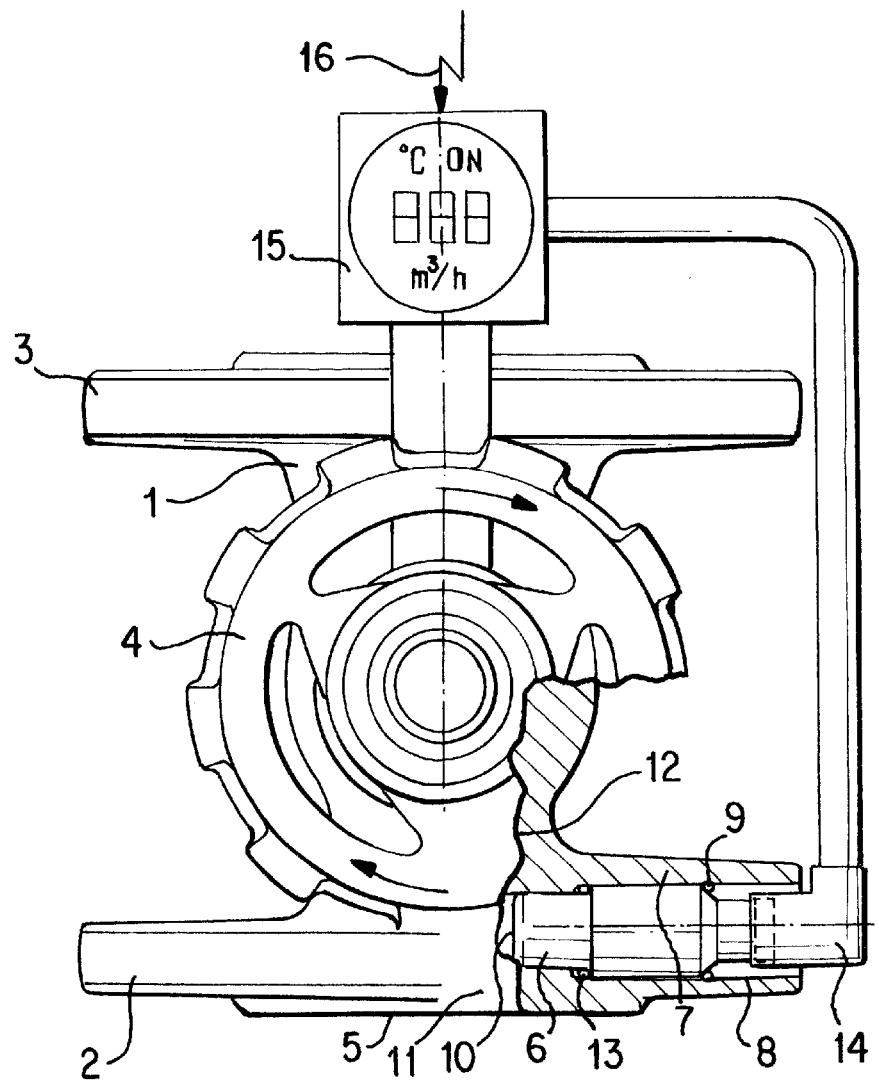
FIG. 1 shows a partially sectional plan view of a shut-off valve configured as a flow regulation control valve.

FIG. 1 shows a plan view of a flow regulation control valve 1 which is fitted with flanges 2, 3 and a hand wheel 4.

In this illustrative embodiment, a sensor 6 is integrated into the flange 2 on the inflow side 5. Due to the size of the sensor shown here, the flange 2 has a recess 7 with a bore 8. This bore 8 receives the sensor 6 which, with its end 10, protrudes slightly into the flow chamber 11. A certain projection beyond the wall surface 12 of the housing of the flow chamber 11 has proved to be expedient in order also to measure the actual flow conditions outside the boundary layer flow located in the edge zone. Escape of the flow medium through the bore 8 is prevented by seals 13. The mechanical fixation in the axial direction is effected by a securing ring 9. Depending on the construction of the housing, the sensor may also be arranged at a different location at which the integration can be carried out with little outlay.

Here a connecting means 14 is connected between a display unit 15 and an output of the sensor. In this case, the connecting means may be configured as a plug-in, screw-in or other customary connecting means for producing electrical connections.

The display unit 15 may be supplied with electrical power from an external voltage source 16 and/or have an integrated voltage source. This may be accumulators, batteries, mains devices or the like. With the aid of appropriate switching or display elements, the respective volume flow and optionally also the prevailing temperature can be displayed continuously or when required.

The specific characteristic values for the housing of this flow regulation control valve are stored in a data store of the sensor 6. An appropriate calibration and programming operation can be carried out by the manufacturer or, if necessary, input at the installation site. To facilitate regulation of the flow, the sensor 6 is connected to an evaluation unit which reads out the respective characteristic values from the integrated data store and calculates and displays the throughflow volume with the aid of the measuring signal. There is no need for further parameters such as, for example, the stroke position to be entered manually with the Δp method. The storage of the respective characteristic values of the housing directly in the sensor serves in a very simple manner to avoid errors. In apparatus in which the corresponding characteristic values are stored in an external unit, it must be ensured that, for an adjustment, a precise association between the housing to be adjusted and the appropriate characteristic values also takes place.

Figure 2:
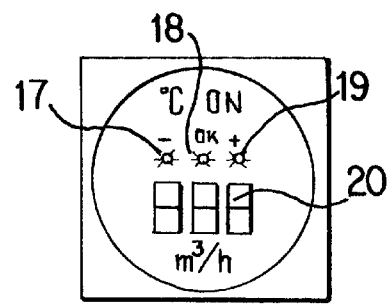
FIG. 2 shows another view of a display unit.

The view of the display unit illustrated in FIG. 2 shows a possible design of a target value/actual value comparison. To adjust the volume flow, it has control lamps of different coding or color. When using light-emitting diodes 17, 18, 19 of different colors, red light-emitting diodes 17, 19 may display unacceptable volume flows, while a green light-emitting diode 18 is used for the acceptable volume flow. A simple setting as well as later checking by comparing the colors would thus be possible. The voltage supply for the display unit can be branched off from a power main. Here too, the possibility of storing the characteristic values inside the sensor advantageously provides a simple calibration possibility and an easy possibility of later adjustment. Another possibility of the target value/actual value comparison is to show the indication LOW in the display if the value drops below the desired value or the indication HIGH if the desired value is exceeded.

A display 20, which is illustrated here as a digital display, illustrates the volume flow measured. The technical measuring unit employed for this purpose can easily be adapted to different systems of units and is not limited to the unit $m^3/h$ shown. An analog display can likewise be used.

Figure 3:
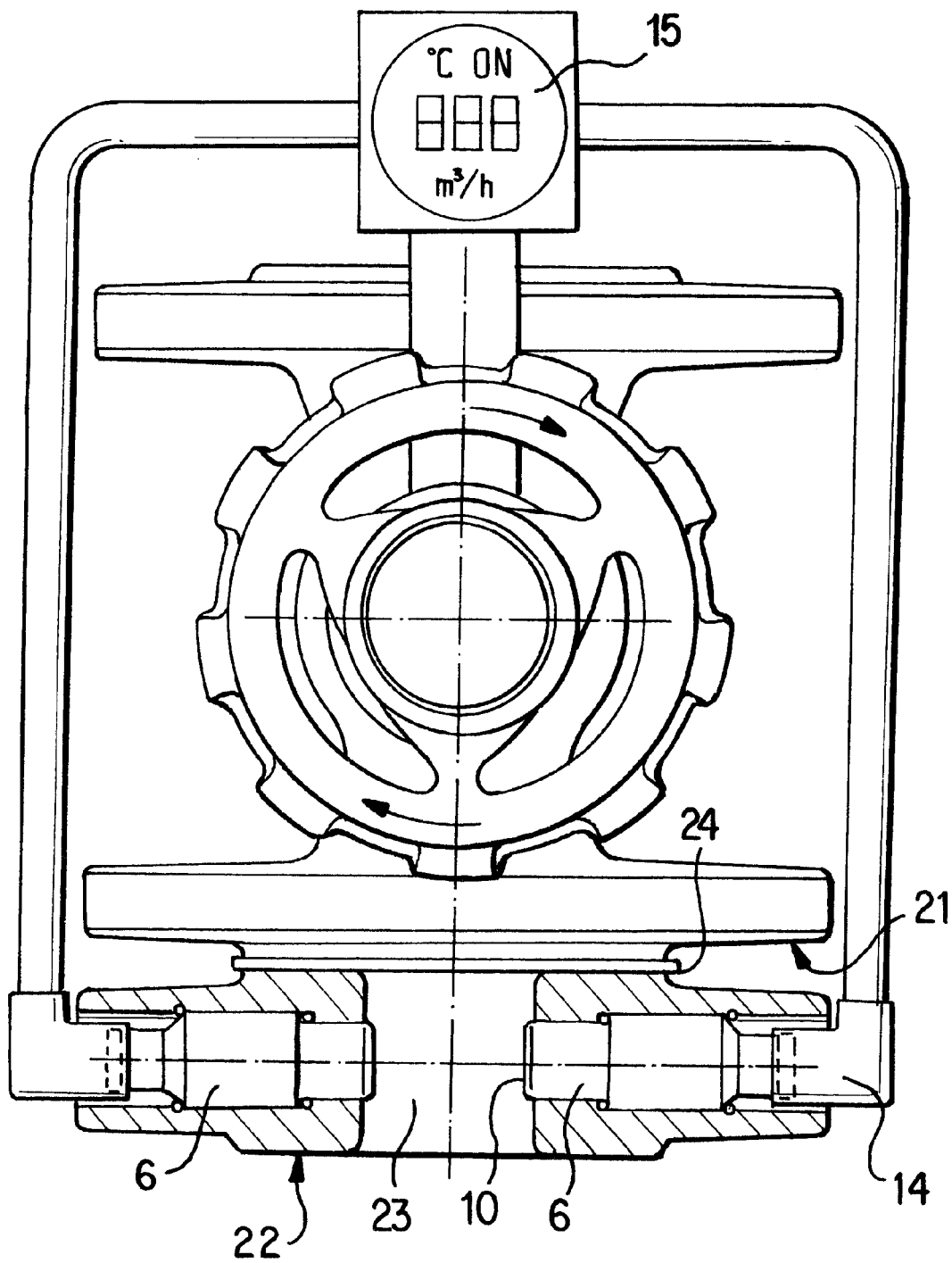
FIG. 3 shows a flow regulation control valve constructed as a multi-part modular unit.
Figure 4:
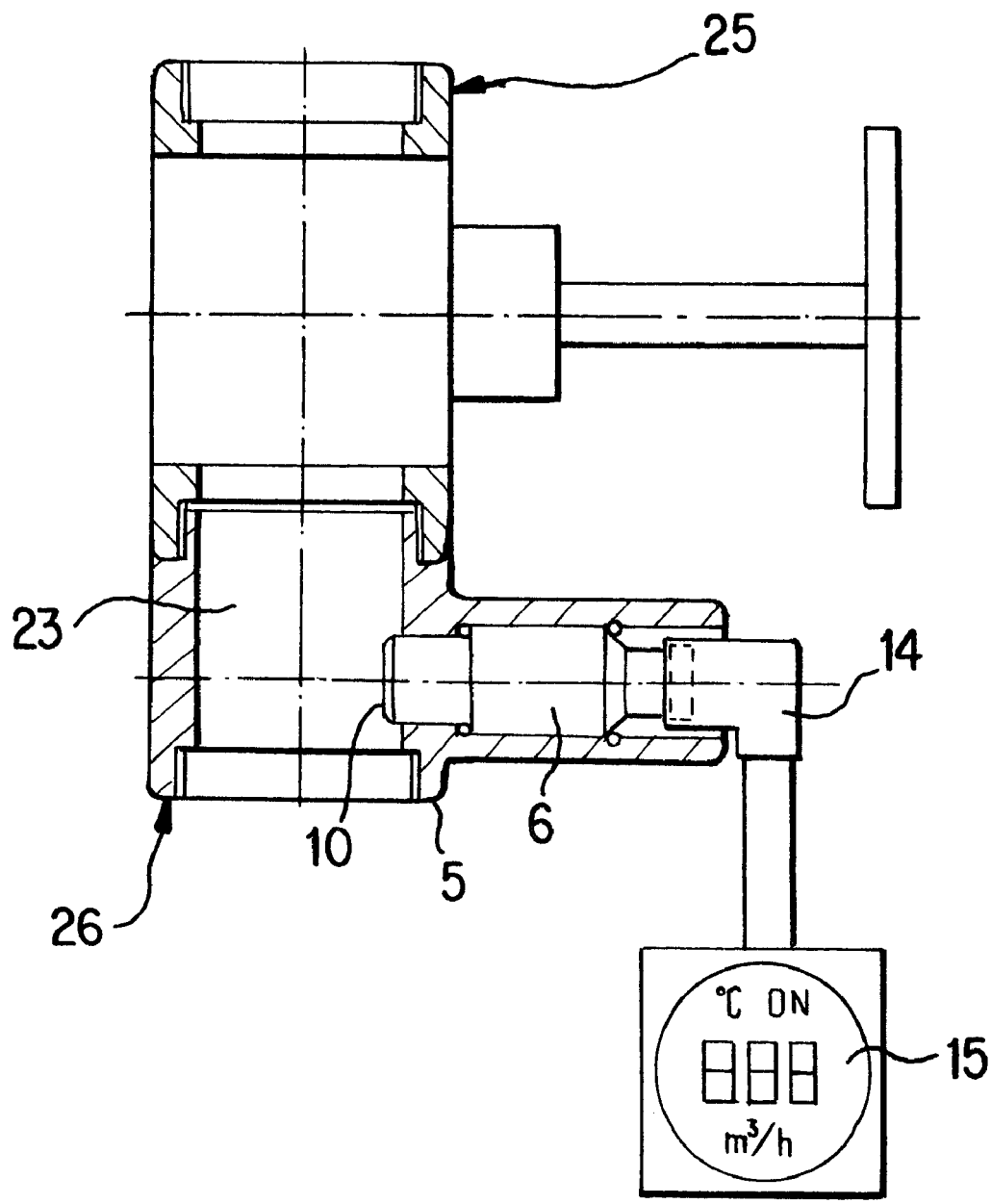
FIG. 4 shows a technical modification of FIG. 3.

FIG. 3 shows a flow regulation control valve which is configured as a multi-part modular unit. For this purpose, a conventional shut-off valve (in the illustration a compact valve with a short construction length was used) can be connected to a separate flow housing 22 having a sensor 6 integrated therein. By way of example, a sensor arrangement is shown here which uses a plurality of sensors 6. These are arranged distributed around the circumference. The angular spacing of the sensors must be adapted to the flow conditions prevailing in the valve. The flow housing 22 can be a one-part or multi-part construction. Such a sensor arrangement is also possible in an embodiment as is shown in FIGS. 1 and 4. The arrangement, affixation and sealing of the sensors 6 corresponds to the illustration of the sensor in FIG. 1. The end 10 of sensor 6 can be flush with the surface or it can protrude with a slight projection into the flow chamber 23 of the flow housing 22. In this illustrative embodiment, the flow housing 22 is configured as a flange disc in order to enable a simple connection to be made, with the interposition of seals 24 or adapters, with the shut-off valve 21 shown as a flange valve and pipes (not illustrated here). The flow regulation control valve configured as a modular unit is calibrated in the assembled form in order to be able to take into account all the influences. Such a flow regulation control valve configured as a modular unit is suitable for reconstruction work on already existing piping systems. Thus, a flow regulation control valve configured as a flow regulation control valve module can be used instead of a shut-off valve with the customary long valve construction length. Due to the fact that the flow regulation control valve module has been calibrated once, reproducible measuring results can be achieved without measurement problems, with which it is possible to carry out a precise adjustment of the flow through pipe sections of a wide variety of types. The major advantage of such a flow regulation control valve is its short construction length compared to the previously customary volume flow measuring instruments with their long settling routes which were necessary for operational reasons.

FIG. 4 shows a flow regulation control valve configured as a modular unit with a different type of connection. The shut-off valve 25 has a housing constructed as a sleeve into which pipes to be connected can be plugged or screwed. In accordance with the internal construction of the valve, a separate flow housing 26 with a sensor 6 arranged therein in a similar way to FIGS. 1 and 3 is fastened on that side of the housing which, during the calibration, yields the most favorable reproducible values. As shown in the tests, this is usually the inflow side. The installation of the sensor 6 is not limited to the form illustrated. Depending on the shape and construction of the sensor, a type of installation, sealing, fastening and connection different from that shown could also be selected. The size of the sensor 6 used and the shape of its housing permit screw, clamping, rivet, bonded and other known types of sensor fastening.

A section control valve can thus be manufactured which can be produced as a functional module in a very simple manner from a modification of a mass produced product. By simple direct or indirect adaptation of a sensor in or on a housing of a shut-off valve, in which case designs with good throttling properties are advantageous but are not a prerequisite, and with measuring calibration of a flow regulation control valve formed in this way, a flow regulation control valve is produced for the convenient adjustment of the flow through pipe sections.

What is claimed is:

1. A flow regulation control valve for setting volume flows in pipes, said flow regulation control valve comprising a flow chamber, a control or shut-off member arranged in the flow chamber for setting a desired flow state therethrough, a sensor arranged in or adjacent the flow chamber for sensing a characteristic value of a flow through the flow chamber, an electronic data store for storing specific characteristic values of the flow regulation control valve, and an evaluation unit which determines the volume flow from the characteristic value measured by the sensor with reference to the specific characteristic values stored in the electronic data store.

2. A section control valve according to claim 1, further comprising a display for displaying sensed flow characteristics or flow values.

3. A section control valve according to claim 1, further comprising a recorder for recording sensed flow characteristics or flow values.

4. A flow regulation control valve according to claim 1, wherein the flow chamber of the flow regulation control valve is partially formed by a separate flow housing, and the sensor is arranged in or adjacent the flow chamber on said separate flow housing.

5. A flow regulation control valve according to claim 1, wherein said at least one sensor operates according to a calorimetric measuring principle.

6. A flow regulation control valve for setting volume flows in pipes, said flow regulation control valve comprising a flow chamber, a control or shut-off member arranged in the flow chamber for setting a desired flow state therethrough, a sensor arranged in or adjacent the flow chamber for sensing a characteristic value of a flow through the flow chamber, an electronic data store for storing specific characteristic values of the flow regulation control valve, and an evaluation unit which determines the volume flow from the characteristic value measured by the sensor with reference to the specific characteristic values stored in the electronic data store, wherein said sensor is arranged in a wall of the flow chamber flush with a surface of said flow chamber wall.

7. A flow regulation control valve for setting volume flows in pipes, said flow regulation control valve comprising a flow chamber, a control or shut-off member arranged in the flow chamber for setting a desired flow state therethrough, a sensor arranged in or adjacent the flow chamber for sensing a characteristic value of a flow through the flow chamber, an electronic data store for storing specific characteristic values of the flow regulation control valve, and an evaluation unit which determines the volume flow from the characteristic value measured by the sensor with reference to the specific characteristic values stored in the electronic data store, wherein said sensor is arranged in a wall of the flow chamber projecting slightly into the flow chamber.

8. A flow regulation control valve according to claim 1, wherein the evaluation unit is connected to the sensor by an intervening connector.

9. A flow regulation control valve according to claim 1, wherein said electronic data store contains housing-specific characteristic values in a form selected from the group consisting of a table, a characteristic curve, and an algorithm.

10. A flow regulation control valve according to claim 9, wherein the electronic data store is integrated into the sensor.

11. A flow regulation control valve according to claim 1, wherein a data store having a small storage capacity is integrated into the sensor for storing a valve code.

12. A flow regulation control valve according to claim 1, wherein said electronic data store is integrated into the evaluation unit.

13. A flow regulation control valve according to claim 1, wherein at least one component selected from the group consisting of the evaluation unit and the sensor is provided with an interface for data exchange.

14. A flow regulation control valve according to claim 1, wherein the evaluation unit is arranged on the section control valve.

15. A flow regulation control valve according to claim 1, wherein the evaluation unit is configured as a mobile device.

16. A flow regulation control valve according to claim 1, wherein the evaluation unit is integrated into said at least one sensor.

17. A flow regulation control valve according to claim 1, wherein the evaluation unit is provided with a display.

18. A flow regulation control valve according to claim 17, further comprising a voltage supply operatively associated with said evaluation unit.

19. A flow regulation control valve according to claim 1, wherein the sensor is arranged on the inflow side of the flow chamber.

20. A flow regulation control valve according to claim 1, wherein the sensor is fitted with a temperature recording device for determining the heat content of the flow through the flow chamber.

* * * * *